US008105040B2

(12) United States Patent
Vronsky et al.

(10) Patent No.: US 8,105,040 B2
(45) Date of Patent: Jan. 31, 2012

(54) WIND TURBINE ROTOR BLADE

(75) Inventors: Tomas Vronsky, Woolston Southampton (GB); Frank Hoelgaard Hahn, Rinkøbing (DK)

(73) Assignee: Vestas Wind Systems A/S, Aarhus N (DK)

( * ) Notice: Subject to any disclaimer, the term of this patent is extended or adjusted under 35 U.S.C. 154(b) by 459 days.

(21) Appl. No.: 12/357,803

(22) Filed: Jan. 22, 2009

(65) Prior Publication Data

US 2010/0119373 A1 May 13, 2010

(30) Foreign Application Priority Data

Nov. 7, 2008 (GB) .................................. 0820324.2

(51) Int. Cl.
*F03D 11/00* (2006.01)
*F03D 11/04* (2006.01)

(52) U.S. Cl. ................ 416/204 R; 416/210 R; 416/224; 416/229 R

(58) Field of Classification Search ........................ None
See application file for complete search history.

(56) References Cited

U.S. PATENT DOCUMENTS 3,784,322 A * 1/1974 Erich et al. ................ 416/229 R
4,412,784 A * 11/1983 Wackerle et al. ............ 416/230
4,602,892 A * 7/1986 Brookstein et al. ........... 403/265
4,915,590 A * 4/1990 Eckland et al. .............. 416/225
5,354,175 A 10/1994 Coleman et al.
5,836,800 A 11/1998 Liu
6,663,314 B2 * 12/2003 Bequet ....................... 403/408.1
7,163,378 B2 * 1/2007 Kildegaard .................. 416/230
7,438,533 B2 * 10/2008 Eyb et al. ...................... 416/230
2007/0231146 A1 * 10/2007 Birkemeyer et al. ..... 416/204 R
2007/0253819 A1 * 11/2007 Doorenspleet et al. ... 416/134 A
2008/0069696 A1 3/2008 Ball

FOREIGN PATENT DOCUMENTS

AU 2004247325 B2 12/2004
DE 10 2005 039 434 A1 2/2007
DE 10 2006 022 272 11/2007
EP 1 234 984 8/2002
EP 1 956 235 A1 * 8/2008
FR 2 863 321 6/2005
JP 2003293935 A 10/2003
JP 2007132295 A 5/2007
NL 8800283 2/1988
SU 1514970 A1 7/1987
WO WO 03/082551 10/2003

OTHER PUBLICATIONS

Nithi Nithiananthan; Search Report issued in priority Great Britain Application No. GB0820324.2; Feb. 27, 2009; 1 page; GB Intellectual Property Office.
Marco Balice; International Search Report issued in related International Application No. PCT/GB2009/051466; Sep. 7, 2010; 2 pages; European Patent Office.

* cited by examiner

*Primary Examiner* — Scott B Geyer
(74) *Attorney, Agent, or Firm* — Wodd, Herron & Evans, L.L.P.

(57) ABSTRACT

A wind turbine rotor blade is provided, the rotor blade comprising a root portion and a tip portion extending therefrom. The root portion comprises a plurality of inserts embedded therein, each insert being configured to receive respective connecting means for connecting the wind turbine rotor blade to a wind turbine hub. The inserts are of at least two different lengths such that they extend into the rotor blade by different distances.

10 Claims, 2 Drawing Sheets

WIND TURBINE ROTOR BLADE

The present invention relates to the field of wind turbine rotor blades and, in particular, to the connection of said rotor blades to a wind turbine hub.

Wind turbine rotor blades are typically made from one or more composite materials. The composite material is generally a laminated material, whereby layers of reinforcing material are bonded to one another with a resin and, subsequently, cured to consolidate a component, here a wind turbine rotor shell. Such materials do not have the structural integrity to provide a secure fixing mechanism into which, for example, threaded bolts may be directly inserted. A hole may be tapped into the composite material of the rotor shell to provide a complementing thread upon which a bolt may achieve a secure purchase. However, when an interface between the bolt and the shell is exposed to relative movement between the rotor hub and the rotor blade, the composite material would be too soft to prevent movement by the bolt and deterioration of the composite material would occur either through a crumbling or delamination failure mechanism.

For this reason, it is known for wind turbine rotor blades to comprise internally threaded metal inserts which are embedded into the root portion of the blade. Fixing bolts may be used in combination with these inserts to achieve a secure connection between the rotor hub and the rotor blade.

FIG. 1 illustrates a conventional rotor blade configuration whereby a rotor blade 2, comprising composite material, has, at its root end 4, a plurality of inserts 6 embedded therein. Inserts 6, are typically introduced into the root end 4 during manufacture of the composite rotor blade 2 in a conventional manner.

Each insert 6 is generally made from metal, e.g. steel. The material properties of steel and composite vary significantly, in particular the stiffness which is quantified by Young's modulus.

In operation, aerodynamic loads are exerted on each rotor blade 2 and the rotor hub is rotatably driven. Significant levels of dynamic structural loading are transmitted between the rotor hub and each rotor blade 2. This axial load is carried by the inserts 6 and is transmitted to the surrounding composite material of the rotor blade 2 adjacent to a tip end of the insert 6. Significant local stress is, therefore, experienced in the composite material at the tip of each insert 6. Consequently, a localised stress region configured in a chordwise line, is experienced by the rotor blade 2. If an increased loading is experienced in this region for some reason, e.g. failure of an insert due to some material flaw or manufacturing defect, the loading associated with the neighboring inserts will, consequently, be increased. Such a failure can lead to an accumulation of stress which may, in the extreme, lead to catastrophic failure of the rotor blade 2.

It is desirable to provide an alternative fixing means for connecting a wind turbine rotor blade to a wind turbine hub which avoids the aforementioned problems.

According to a first aspect, the present invention provides a wind turbine rotor blade comprising a root portion and a tip portion extending therefrom, the root portion comprising a plurality of inserts embedded therein, each insert being configured to receive connecting means for connecting the wind turbine rotor blade to a wind turbine hub, wherein a first insert has a first length and a second insert has a second length, different to the first length.

By providing inserts having different lengths, stresses induced by differences in property materials between the material of an insert and the material of the root portion occur at different axial locations. By distributing the stress in this way, a smooth transition of loading is achieved between the wind turbine rotor blade and the wind turbine hub and a cumulative stress at one particular axial location is, therefore, avoided. Rather, the loading becomes distributed over a broader axial region of the length of the blade. Consequently, propagation of any failure experienced at the interface between the tip of an insert and the wind turbine rotor blade is inhibited and a more robust connection of the rotor blade to the hub is achieved.

A third insert having a third length, different to each of the first and second lengths may be provided to further distribute the load. Indeed, a plurality of different lengths may be considered.

Each insert may comprise a respective threaded bore. The lengths of the inserts may be in the range of 5 to 30 times a diameter of the respective bore. The difference between the lengths of two adjacent inserts may be in the range of 2% and 50% of the length of the longer of the two inserts, preferably in the range of 5% to 20% of the length of the longer of the two inserts.

Each connecting means may comprise a bolt, preferably a single bolt, the insert being configured accordingly.

According to a second aspect, the present invention provides a wind turbine installation comprising:

a tower;

a hub mounted atop the tower; and a rotor blade of the aforementioned type, connected to the hub by plurality of bolts, each bolt being located in a respective hole formed in the hub and being received by a respective insert in the rotor blade.

The present invention will now be described in more detail, by way of example only, with reference to the figures, in which:

FIG. 2 illustrates a conventional insert 6 of the type shown in FIG. 1. In this example, each insert is made from metal such as steel, however, alternative materials having suitable stiffness properties, such as a reinforced plastics material, could be used.

The insert 6 comprises a body portion 6*a,* which in this embodiment is substantially cylindrical, in combination with a tail portion 6*b* which in this embodiment is tapered. The tail portion 6*b* reduces in dimension from a proximal portion which matches the dimensions of the body portion to a distal portion, having a substantially reduced diameter, e.g. to define a point. The reduction in diameter of the tail portion 6*b* serves to increase the flexibility of the insert 6 in a region away from the body portion 6*a*. Other shapes of insert could be readily used.

Upon installation, one end of the body portion 6*a* is located flush with the extreme root end of the rotor blade 2 and the insert 6 extends axially into the material of the rotor blade 2. A bore 8 is formed in the body portion 6*a* of the insert 6. At least part of the bore 8 is tapped so that the bore 8 is configured to receive a bolt (not shown) for securing the rotor blade 2 to a rotor hub (not shown). Each insert 6 extends into the rotor blade 2 by a distance L.

Figure 1:
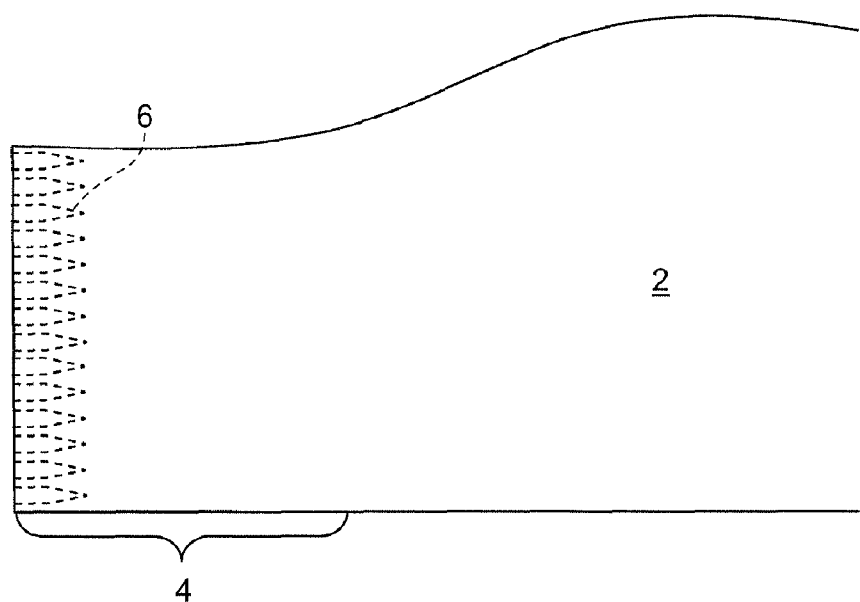
FIG. 1 represents a schematic of a conventional rotor blade.
Figure 2:
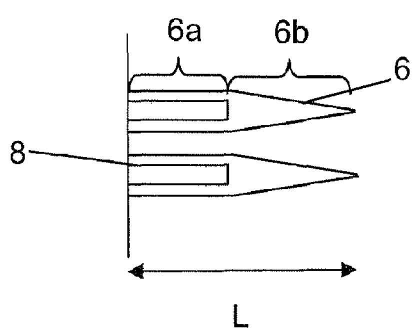
FIG. 2 represents a schematic of a conventional insert.
Figure 3:
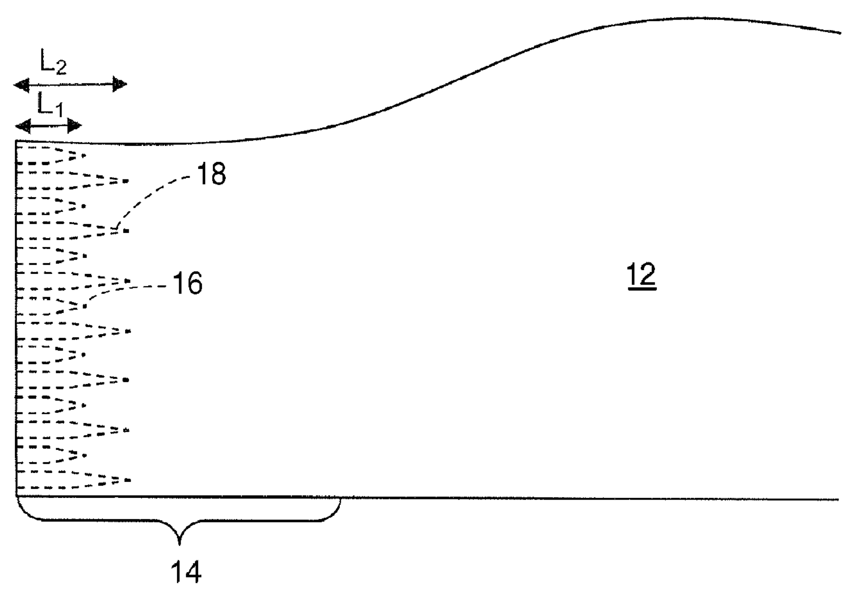
FIG. 3 represents a rotor blade having non uniform inserts.

FIG. 3 illustrates an embodiment of the present invention for connecting a rotor blade 12 to a rotor hub (not shown). Inserts 16, 18, having a similar configuration to insert 6 of the previous example, are provided in a root portion 14 of the rotor blade 12. However, insert 16 differs from insert 18 in that the length, $L_1$, of insert 16 is somewhat shorter than the length, $L_2$, of insert 18. Upon installation, as shown, inserts 16 and 18 are alternately located so that tips of adjacent inserts do not lie at the same axial location along the rotor blade 12 as in the conventional configuration described above In contrast, the shorter inserts 16 extend into the root portion 14 of the rotor blade 12 by a distance L1 whereas the longer inserts 18 extend further into the root portion 14 of the rotor blade 12, by a distance L2. Consequently, transmission of load from the respective inserts 16, 18 to the bulk composite material of the rotor blade 12 occurs over a broader axial region of the rotor blade 12. It follows that a smoother transition of loading is achieved over this region and the localised stress pattern seen in the conventional rotor blade 2 described above is avoided.

If one insert 16, 18 were to fail, the transmission of loading from the inserts to the rotor blade 12 become distorted. In this embodiment, neighboring inserts extend into rotor blade 12 by a different amount than the failed insert. Propagation of stress experienced as a result of the failed insert to the location of the inserts is inhibited. Cumulative loading, is therefore, also inhibited and catastrophic failure of the blade 12 may be avoided, or at least delayed.

The lengths $L_1$, $L_2$, of respective inserts lie in the range of 5 to 30 times a diameter of the internal bore 8 formed within the insert. The difference between two adjacent inserts, represents the axial distance over which the stresses, associated with the tip of the inserts, are distributed. This difference lies in the range of 2% to 50% of the length of a longer of the two adjacent inserts. Preferably, the difference is in the range of 5% to 20% of the length of a longer of the two adjacent inserts.

Figure 4:
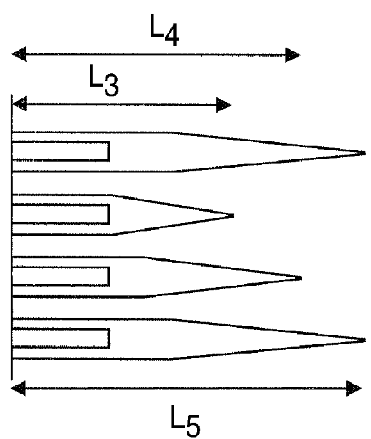
FIG. 4 represents a rotor blade having non-uniform inserts.

In a more sophisticated embodiment, as suggested in FIG. 4, further inserts having one or more additional different lengths, say $L_3$, $L_4$, $L_5$, may be introduced to further distribute the loading experienced at the tips of the inserts during operation. Thus, the axial range over which loads are transmitted is further extended and/or distributed and the stress concentrations become dispersed rather than accumulated.

The inserts 16, 18 are introduced into the rotor blade 12 during manufacture thereof. The rotor blade 12 may be made up from a number of preformed sheets of fibres of predetermined orientation that are impregnated with a resin. As the blade is layered up, the inserts can be introduced to the mould and the materials formed in a mould thereabout. The blade 12 is then cured and the inserts secured in the bulk material.

Alternatively, the blade 12 may be laid up and cured without the inserts present. Holes for receiving the inserts are subsequently machined into the root portion 14 of the rotor blade 12. Inserts are introduced into these holes in the presence of an adhesive material such that they become securely bonded in place.

In the previous embodiment each respective insert is configured to receive a single bolt, however, in an alternative embodiment, the insert could be elongated and configured to receive two or more bolts.

The invention has been described with reference to specific examples and embodiments. However, it should be understood that the invention is not limited to the particular example disclosed herein but may be designed and altered with the scope of the invention in accordance with the claims.

The invention claimed is:

1. A wind turbine rotor blade comprising a root portion and a tip portion extending therefrom, the root portion comprising a plurality of inserts embedded therein and extending axially into the rotor blade, each insert being configured to engage respective connectors for connecting the wind turbine rotor blade to a wind turbine hub, wherein a first insert has a first length and a second insert has a second length different to the first length.

2. The rotor blade according to claim 1, wherein the root portion comprises a third insert having a third length different to each of the first and second lengths.

3. The rotor blade according to claim 1, wherein each insert comprises a respective threaded bore.

4. The rotor blade according to claim 3, wherein the lengths of the inserts are in the range of 5 to 30 times a diameter of the respective bore.

5. The rotor blade according to claim 1, wherein the difference between the lengths of two adjacent inserts is in the range of 2% and 50% of the length of the longer of the two inserts.

6. The rotor blade according to claim 5, wherein the difference between the lengths of two adjacent inserts is in the range of 5% to 20% of the length of the longer of the two inserts.

7. The rotor blade according to claim 1, wherein each connector comprises a bolt.

8. The rotor blade according to claim 7, wherein each connector comprises a single bolt.

9. The rotor blade according to claim 1, wherein each of the plurality of inserts is formed from a material that is different from the material of the rotor blade in which the inserts are embedded.

10. A wind turbine installation comprising:

a tower;

a hub mounted atop the tower; and a rotor blade comprising a root portion and a tip portion extending therefrom, the root portion comprising a plurality of inserts embedded therein and extending axially into the rotor blade, wherein a first insert has a first length and a second insert has a second length different to the first length, wherein the rotor blade is connected to the hub by plurality of bolts, each bolt being located in a respective hole formed in the hub and engaging a respective insert in the rotor blade.

* * * * *